3,390,826
ADVANCING MECHANISM FOR A SEMI-AUTOMATIC SOLDER FEEDING APPARATUS
Charles F. Davis, 6307 Agnes Ave.,
North Hollywood, Calif. 91606
Filed Oct. 11, 1966, Ser. No. 585,836
13 Claims. (Cl. 228—53)

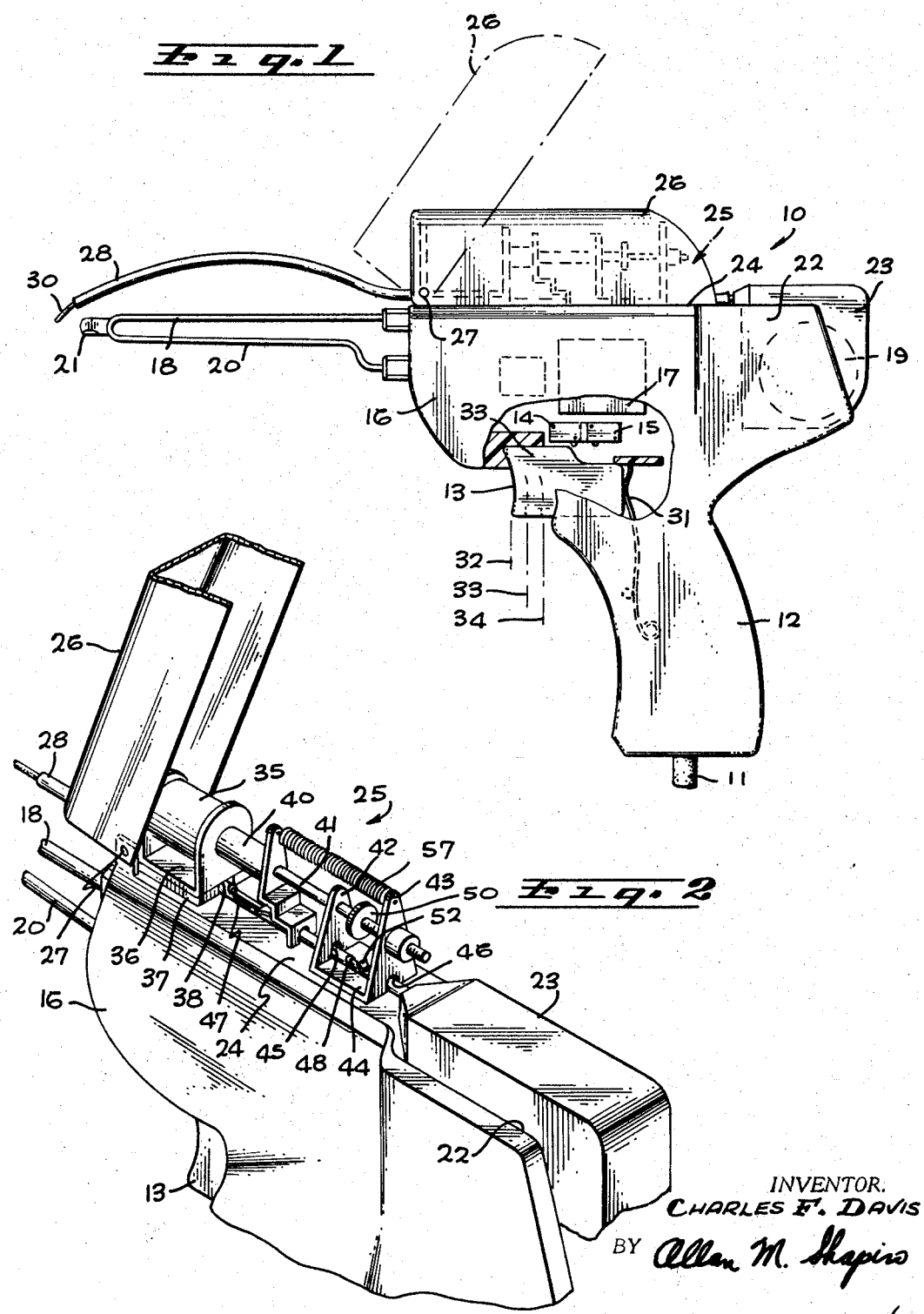

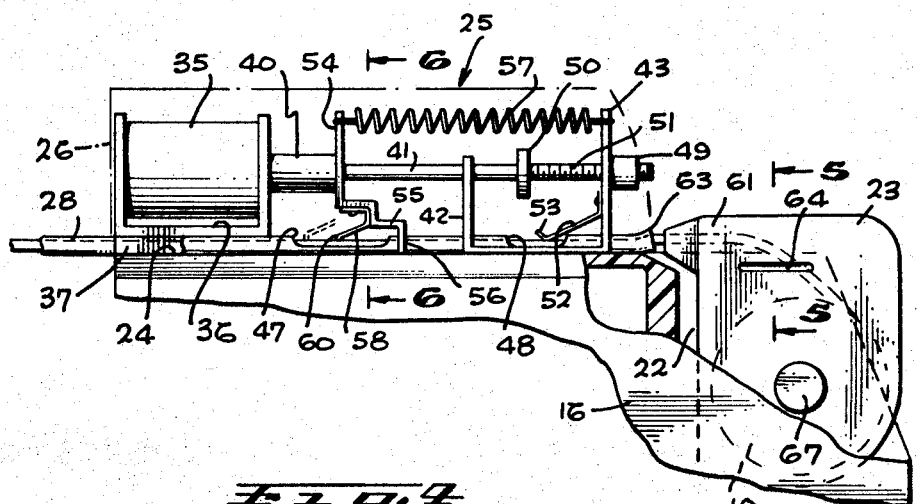
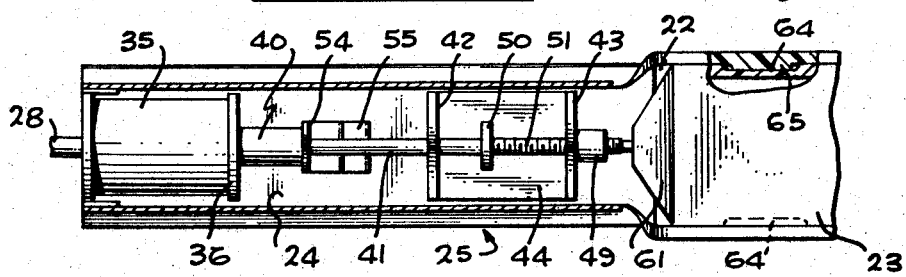
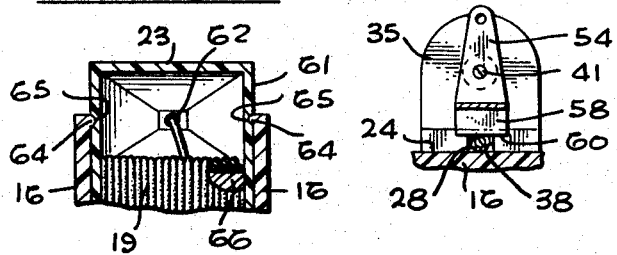
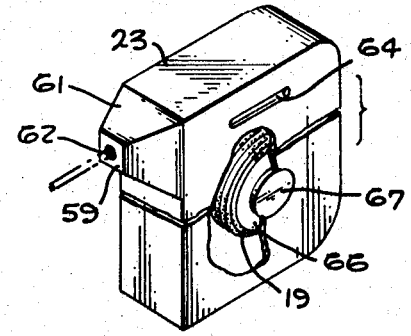
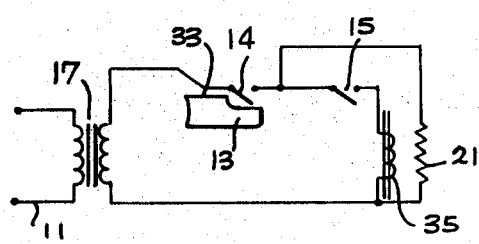
INVENTOR.
CHARLES F. DAVIS
BY Allan M. Shapiro
ATTORNEY United States Patent Office 3,390,826
Patented July 2, 1968

This invention relates to semi-automatic solder feeding apparatus and, more particularly, to such apparatus having a novel solder wire advancing mechanism and replaceable solder wire storage cartridge employing a manually operable switch control for sequentially effecting the heating of the solder iron and selectively advancing solder wire from its stored position.

In the past, conventional semi-automatic solder feeding apparatus has been employed for supplying a quantity of solder to a workpiece upon each cyclic actuation of the apparatus and for adjustably selecting a predetermined quantity of solder to be fed by a single actuation thereof. One such example resides in my disclosure set forth in U.S. Letters Patent 3,219,251, wherein I employ a rotatable means such as a toothed ratchet gear operated by a solenoid via a spring biased mechanism for selectively feeding solder wire carried in coiled form on a reel in response to a trigger switch mechanism.

Although the apparatus disclosed in the above mentioned patent is satisfactory for its intended purpose, I have found that the employment of a ratchet wheel and its attendant mechanism for controlling the rotation thereof is relatively expensive to manufacture and not altogether trouble free. Also, it has been found desirable to relocate the supply of solder wire into a more convenient location not only from the viewpoint of directing the solder wire to the advancing mechanism, but to be more compatible with the overall design and mounting of the solder wire coil onto the housing of the apparatus.

Furthermore, difficulties and problems have been encountered with semi-automatic feeding apparatus which sometimes reside in the manually operable switch mechanism employed not only to advance the solder from its stored coil of wire, but in heating the soldering iron so that a suitable amount of heat is available to melt the extreme end of the solder wire into a fluid or molten condition. It has been the conventional practice to employ separate and nonintegrated switch means for independently causing the soldering iron to be heated and for advancing or feeding the solder wire to the end of the iron. Obviously, the circuit arrangement for achieving this double function is arranged in separate electrical circuit relationships and includes a redundancy of electrical components and wiring.

Accordingly, the semi-automatic solder feeding apparatus of the present invention incorporates a novel solder wire advancing mechanism and an electrical switch control therefor which provides for a continuous supply of solder to be fed through a guide tube having an opened channel portion through which access to the solder wire is attained for the forceful feeding thereof. The advancing mechanism includes a movable carriage which is adapted to move rectilinearly in response to the energizing of a solenoid adjacent the solder wire guide tube and which includes a foot element downwardly depending from the carriage having a terminating end extending through the channel portion of the guide tube in communication with a length of the solder wire. The solenoid is secured to the rectilinearly moving carriage and is in operable communication therewith to control the actuation thereof. An electrical control circuit is employed which is connected in parallel so as to supply sufficient power to the apparatus for not only heating the soldering iron, but to energize the solenoid for selectively advancing a predetermined quantity of solder wire. A manually actuated slide member, employed to actuate a pair of microswitches, may be preferably located on the apparatus housing oriented to be operated by index finger actuation to any one of three positions for heating the iron element of the gun, operating the solenoid to advance a given quantity of solder wire or for disconnecting the source of electrical supply for achieving either one of the former operations.

Therefore, it can be seen that the apparatus of the present invention provides a solder wire advancing mechanism employing a simple foot element which engages with the wire when the carriage moves in one direction to advance the wire while slideably engageable with the wire when the carriage moves in an opposite direction to its starting position. By incorporating the coil of stored solder wire in a cartridge which is readily detachably mounted on the housing of the apparatus, a more convenient and handy replacement of the solder wire may be had.

Therefore, it is a primary object of the present invention to provide a semi-automatic solder feeding apparatus incorporating a novel solder wire advancing mechanism employing a single foot element adapted to force the advancement of the solder wire in one direction while being slideably engageable with the solder wire in the opposite direction.

Another object of the present invention is to incorporate into a semi-automatic solder wire feeding apparatus with means for detachably mounting a supply of coiled solder wire enclosed in a cartridge directly onto the housing of the apparatus in such a fashion that the cartridge employed to store the solder wire not only blends in with the overall design of the apparatus, but introduces a length of solder wire to the advancing mechanism in a desirable and more convenient orientation than can otherwise be had.

It is another object of the present invention to provide a novel electrical circuit incorporated into a semi-automatic feeding apparatus having a trigger element adapted to be slideably located in three positions so as to sequentially effect the heating of the soldering iron element and for energizing the advancement mechanism so as to supply a predetermined amount of solder wire length.

Yet another object of the present invention is to provide a novel electrical circuit for a semi-automatic solder feeding apparatus incorporating a pair of microswitches operable by a sliding contact member that are coupled in parallel to a common transformer for selectively supplying current to heat the solder iron and to selectively advance a given length of solder wire to the tip of the solder iron.

Still an additional object of the present invention is to provide a novel cartridge for carrying a supply of coiled solder wire that is adapted to be detachably carried on the housing of a soldering apparatus so that a length of solder wire may be suitably guided to the advancing mechanism carried on the apparatus and wherein the cartridge includes manually operated means for advancing a length of solder wire from its coiled position in the cartridge.

The features of the present invention which are believed to be novel are set forth with particularity in the appended claims. The present invention both as to its organization and manner of operation, together with further objects and advantages thereof, may best be understood with reference to the following description, taken in connection with the accompanying drawings, in which:

FIGURE 1 is a side elevational view of the semi-automatic soldering feeding apparatus incorporating the novel solder wire advancing mechanism and solder storage cartridge of the present invention;

FIGURE 2 is an enlarged perspective view of the solder advancing mechanism illustrated in FIGURE 1;

FIGURE 3 is a side fragmentary elevational view, partially broken away, of the advancing mechanism and the solder storage cartridge illustrating the feedpath of a length of solder wire;

FIGURE 4 is a top plan view of the mechanism shown in FIGURE 3;

FIGURE 5 is a sectional view of the solder cartridge shown in FIGURE 3 as taken in the direction of arrows 5—5 thereof;

FIGURE 6 is a cross sectional view of the solder advancing mechanism as taken in the direction of arrows 6—6 of FIGURE 3;

FIGURE 7 is a perspective view of the solder storage cartridge partially broken away to illustrate the coil of solder stored therein; and FIGURE 8 is a schematic drawing of the electrical circuit employed in the soldering apparatus of FIGURE 1.

Referring to FIGURE 1, one embodiment of an electric soldering gun incorporating the present invention is indicated in the general direction of arrow 10. The solder gun includes a power cord 11 extending from a pistol grip handle 12, a slideable trigger 13 for actuating a heating switch 14 and a solder wire feed switch 15. A central housing or body portion 16 encloses a conventional transformer 17 and is employed to support a pair of low resistant electrically conductive elements 18 and 20 that terminate in a soldering tip 21 which is heated in the well-known manner.

The central housing 16 includes a recess 22 for detachably receiving and seating a cartridge 23 enclosing a coil 19 supply of solder wire. It is to be noted that the top portion of a cartridge 23 projects above a mounting surface 24 upon which is carried a solder wire advancing or feeding mechanism as indicated in the direction of arrow 25. The solder wire advancing mechanism is selectively covered by means of a lid 26 rotatably disposed on hinge 27 to be manually moved between its position shown in solid lines covering the advancing mechanism and the position shown in broken lines in which the advancing mechanism is readily exposed.

A flexible guide tube 28 is employed to slideably carry an extended length of the solder wire so as to project a small portion 30 thereof out of the flexible tube 28 adjacent to the soldering tip 21. The opposite end of the flexible guide tube is adapted to insertably receive the solder wire as the wire is drawn from its storage coil 19 within the cartridge 23.

The trigger switch 13 is adapted to slide in its receptacle provided in the central body housing 16 against the resilient tension of a leaf spring 31. A first position of the trigger 13 is indicated by numeral 32 in which the soldering gun is at rest and neither heat nor solder wire feeding action is produced. A position represented by numeral 33, indicating the leading edge of the trigger mechanism, illustrates that a contact portion 33 of the trigger will engage with the contact button of switch 14 to cause the tip 21 to be heated. A third position of the trigger 13 represented by numeral 34 indicates the leading edge of the trigger in a rearmost position in which not only the contact of switch 14 is closed, but the contact button of switch 15 is also actuated by the trigger portion 33 so as to activate the solder wire advancing mechanism 25. Upon the release of index finger pressure from the trigger 13, the resiliency of leaf spring 31 will cause the trigger to automatically advance to the position indicated by numeral 32.

Referring now in detail to FIGURE 2, a solenoid 35 is provided with a mounting plate 36 which is welded or otherwise secured to a mounting member 37 similarly secured on the surface 24. Preferably, the plate or member 37 includes an open-ended passageway 38 through which the flexible guide tube 28 extends and is held onto the housing 16. An armature or plunger 40 of the solenoid 35 is welded to an extension rod 41 for rectilinear movement thereof. The end of the length of rod 41 opposite to its end connected to the armature 40 is supported in apertures formed in a pair of spaced apart upright elements 42 and 43, respectively, that are carried on a common base 44. The base 44 is suitably secured to the surface of the housing 16 by any conventional manner. Furthermore, the supporting base 44 includes a pair of aligned apertures 45 and 46 formed in upright elements 42 and 43, respectively, which are adapted to accommodate the seating of guide tube 28. It is also to be noted that guide tube 28 includes open channel portions 47 and 48 which expose a portion of the solder wire extending through the entire flexible guide tube 28 for access thereto by the solder advancement mechanism of the apparatus as hereinafter described.

Referring now in detail to FIGURE 3, it is to be noted that one end of the rod 41 abuts against a stop member 50 which is adjustably carried on a threaded shaft 51 that is projected from one side of the upward element 43 so as to limit the rectilinear movement of the rod 41. A collar 49 supports shaft 51 on the element 43 and maintains the stop member 50 substantially coaxial with the rod 41. The movement of the rod is limited by the engagement of its end with stop member 50 as the rod moves in accordance with the actuation of the solenoid 35. A feature of the invention resides in the fact that the stop member 50 can be readily adjusted by rotating the member on shaft 51 to reduce or to increase the stroke length of the rod.

Outwardly projecting from member 43, is a leaf spring 52 having an arcuate terminating end 53 which projects into the channel 48 for placing a slight force on the solder wire as it passes through the guide tube 28. Also carried on rod 41 adjacent its connection to the plunger 40 of the solenoid 35 is a carriage member 54 that is adapted to rectilinearly move in accordance with the movement of the rod 41. The carriage member 54 includes a downwardly depending stepped portion 55 that terminates in a yoke 56 slideably embracing the external surface of a portion of the guide tube 28. The attachment of the carriage member to the rod 41 and the yoke 56 assure proper alignment of the carriage member as it rectilinearly moves in accordance with the solenoid action.

Since the armature 40 of the solenoid 35 is in sliding relationship with respect to the solenoid, a spring 57 is conventionally coupled with the carriage member 54 and the upright element 43 so that the carriage member 54 is biased into its position shown in solid lines. However, upon the energization of the solenoid 35, the carriage member 54 is advanced forwardly. It is to be particularly noted that the carriage member 54 includes a downwardly depending element 58 that includes a foot 60 adapted to engage the surface of the solder wire through the open channel 47. Therefore, when the solenoid is energized so that the carriage 54 moves in its forward position, the element 58 will grip the solder wire and move to the position shown in broken lines to advance the strand of solder wire. Upon the advancement of the strand of solder wire, spring 57 takes over to return the carriage member to the position shown in solid lines whereby the foot 60 slides over the advanced solder wire.

Referring now in particular to FIGURES 3 and 4, it is to be noted that the removable cartridge 23 includes a solder wire dispensing portion 61 that projects outwardly from one end of the cartridge and includes a dispensing aperture 62 through which a strand of solder wire passes. The dispensing aperture 62 is adapted to be in alignment with an opening 63 to the flexible guide tube 28 so that the solder wire is introduced to the guide tube from the coil 19 in a preferred orientation.

FIGURES 5 and 7 more readily portray the cartridge 23 in which the coil 19 of solder wire is enclosed. It is to be noted that the dispensing portion 61 of the cartridge 23 includes tapered walls which are reduced in thickness from its engaging end with the main body of the cartridge 23 to a reduced end 59 in which dispensing aperture 62 is formed. Also, it is to be noted that the side walls of the cartridge 23 include grooves 64 on the opposite side walls thereof into which projections 65 carried by the central body portion 16 releasably projects. In this fashion, the cartridge 23 may be snapped into a seated position on the central portion 16 and when the supply of solder from the reel 19 has been exhausted, the cartridge may be readily removed by unsnapping the projection 65 from the grooves 64. Preferably, the spool of solder wire is wound about a core 66 having a knob 67 projecting through one side wall of the cartridge 23. By manually grasping the knob 67 and rotating the knob, a major length of solder wire may be dispensed through the opening 62. Also, the core 66 may be wound with replacement solder wire by turning knob 67 in a selected direction so that a new coil of replaceable solder wire is stored thereon.

Referring now to FIGURE 8, a circuit diagram is shown for heating the tip 21 and for supplying electrical energy for operating the solenoid 35. It will be noted that the microswitches 14 and 15 are connected in parallel circuits to power transformer 17 which in turn is coupled to a conventional AC power line via cord 11. The trigger switch 13 sequentially operates switches 14 and 15 when the raised portion 33 of the trigger strikes against the push button of each of the microswitches, respectively. By this arrangement, it can be seen that as the trigger is moved rearwardly, switch 14 closes initially to commence heating of the soldering iron tip 21. As the switch 13 moves further rearwardly, switch 15 is closed so that the solder wire is advanced a predetermined amount.

In view of the foregoing, it can be seen that the soldering iron apparatus of the present invention incorporates a novel solder wire advancing mechanism, storage cartridge and electrical circuit. The amount of solder to be exposed to the tip 21 is determined by the setting of limit stop 50. The energizing of switch 14 supplies sufficient electrical energy to the solder iron tip 21 to cause the extreme end of the solder wire 30 to melt. Actuation of switch 15 causes the solenoid 35 to energize which causes the carriage member 54 to move forwardly in response to the movement of armature 40. The movement of the carriage member forward is in opposition to the bias of spring 57 and as the carriage member moves forward, the foot 60 on the element 58 grippingly engages the solder wire through the aperture or channel portion 47 so that the solder wire is moved forward. Once the forward stroke has been completed, the tension of spring 57 takes over when the trigger 13 has been released to de-energize the solenoid 35 so that the carriage member 54 is returned to the position as shown in solid lines in FIGURE 3.

The removable cartridge 23 may be readily snapped into position on the main body 16 and the solder wire may be introduced to the opening 63 of the guide tube 28. Knob 67 may be rotated to feed the solder wire to the guide tube until the extreme end 30 is in close proximity to the tip 21. The engagement of projections 65 in the grooves 64 assure that the cartridge will be retained on the body 16. For removing the cartridge, the projections may be readily snapped out of the grooves.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:
1. Apparatus for feeding solder to the tip of an electrical soldering device comprising:
  mounting means adapted to be secured to the soldering device;
  conduit means secured to said mounting means for receiving and guiding a solder wire therethrough to the soldering tip;
  an open channel portion formed in said conduit means for laterally exposing a portion of the solder wire;
  a carriage member having a foot element in engagement with the solder wire via said open channel portion;
  selectively actuatable drive means in rectilinearly movable relationship to said conduit means fixedly secured to said carriage member for causing selective alternating forward and rearward movement of said carriage member;
  said driving means including a solenoid having a rectilinearly reciprocable armature being effectively secured to said carriage member in driving relationship thereto; and
  said foot element being adapted to grip the solder wire during forward movement of said carriage member and to slide along the solder wire during rearward movement of said carriage member whereby said carriage member drives the solder wire through said conduit means during such forward movement only.

2. The invention as defined in claim 1 wherein
said conduit means includes a second open channel portion formed therein for laterally exposing a second portion of the solder wire; and
a resilient retainer element secured to said mounting means and having an arcuate portion in sliding surface engaging relationship with said second portion of the solder wire.

3. The invention as defined in claim 2 wherein
said carriage member includes a yoke adapted to slidably embrace a portion of said conduit means to the rear of said first mentioned open channel portion.

4. The invention as defined in claim 2 including
a cartridge carried on the soldering device to the rear of said mounting means for storing a quantity of coiled solder wire and being adapted to introduce a strand of the solder wire to one end of said conduit means; and
wherein the central axis of rotation of said coil of solder wire is located to rear and below the major axis of said conduit means.

5. The invention as defined in claim 4 including
stop means carried on said mounting means and adapted to interfere with the rectilinear movement of said carriage member so as to effectively control the length of rearward stroke of said carriage member.

6. The invention as defined in claim 4 wherein
the soldering device includes a recess formed in the body thereof at the rear of said mounting means and being adapted to removably receive said cartridge;
said cartridge having at least one groove formed in each sidewall on opposite sides of said cartridge; and
projections extending into said recess in opposing relationship with respect to each other and being adapted to be snap-locked into said groove to detachably retain said cartridge in said recess.

7. The invention as defined in claim 6 wherein
said cartridge includes a tapered dispensing portion extending towards said conduit means and having a dispensing aperture in axial alignment with said conduit means so that the solder wire may be introduced to said conduit means from said coil via said aperture.

8. The invention as defined in claim 2 including
a manually operable switch adapted to connect said solenoid with a source of power;
said switch being located on the device for actuation by the index finger of the operator during normal operation of the device.

9. The invention as defined in claim 8 including
an electrical circuit incorporating a pair of switches coupled to a solder iron element and to said solenoid respectively in parallel with said source of power and adapted to be sequentially actuated by said first mentioned switch to first heat said solder iron element and secondly, to energize said solenoid.

10. Apparatus for feeding solder to the tip of an electrical soldering device comprising:
mounting means adapted to be secured to said soldering device;
conduit means secured to said mounting means for receiving and guiding a wire of such solder therethrough to said soldering tip;
an open channel portion in said conduit means for laterally exposing a portion of said solder;
selectively actuable drive means coupled to said solder through said open channel portion for causing selective forward movement of said solder;
means for selectively energizing said electrical soldering device;
means for selectively actuating said drive means; and
means preventing actuation of said drive means prior to energization of said electrical soldering device.

11. Apparatus in accordance with claim 10 wherein said drive means includes a solenoid having a rectilinearly movable armature and means for coupling said armature to said solder in said open channel portion.

12. Apparatus in accordance with claim 11 including
a first manually operable switch adapted to connect said solenoid with a source of power; and
a second manually operable switch adapted to connect said electrical soldering device to said source of power, said second switch being connected between said first switch and said source of power.

13. The invention as defined in claim 12 including
a trigger slide actuator adapted for actuation by the index finger of the operator during normal operation of the soldering device; and
wherein said pair of switches are disposed with respect to each other to be sequentially actuated in response to the actuation of said trigger slide actuator.

References Cited

UNITED STATES PATENTS

| | | | |
|---|---|---|---|
| 3,219,251 | 11/1965 | Davis | 228—53 |
| 3,068,826 | 12/1962 | Meader | 228—53 |
| 2,833,904 | 5/1958 | Cunningham | 228—53 |
| 2,871,333 | 1/1959 | Savage | 228—53 |

RICHARD H. EANES, JR., *Primary Examiner.*